Nov. 7, 1950 S. A. STOLBERG 2,529,474

AUTOMATIC PHONOGRAPH

Filed Feb. 8, 1947 3 Sheets-Sheet 1

INVENTOR.
Sven A. Stolberg
BY
Foorman L. Mueller
Atty.

Nov. 7, 1950 S. A. STOLBERG 2,529,474

AUTOMATIC PHONOGRAPH

Filed Feb. 8, 1947 3 Sheets-Sheet 2

INVENTOR.
Sven A. Stolberg,
BY
Foorman L. Mueller
Atty.

Nov. 7, 1950 S. A. STOLBERG 2,529,474

AUTOMATIC PHONOGRAPH

Filed Feb. 8, 1947 3 Sheets-Sheet 3

INVENTOR.
Sven A. Stolberg,
BY
Foorman L. Mueller
Atty.

Patented Nov. 7, 1950

2,529,474

UNITED STATES PATENT OFFICE 2,529,474

AUTOMATIC PHONOGRAPH

Sven A. Stolberg, Chicago, Ill., assignor, by mesne assignments, to Raytheon Manufacturing Company, Newton, Mass., a corporation of Delaware Application February 8, 1947, Serial No. 727,363

5 Claims. (Cl. 274—10)

The present invention relates to automatic phonographs and more particularly to a stop mechanism for such phonographs for automatically discontinuing the operation thereof following the playing of the last record of a series of records which were initially disposed in a record stack associated with the phonograph. Specifically, the present invention is an improvement on the invention disclosed and claimed in copending application for Letters Patent of the United States, Serial No. 607,878, filed July 30, 1945, and assigned to the same assignee as the present application.

Automatic phonographs are in extensive use today particularly combined with radio receiving devices in what is commonly termed as a radio-phonograph combination. A very common form of automatic phonograph includes means for supporting a stack of unplayed records adjacent to and above the turntable from which stack records are fed one at a time onto the turntable. Such automatic phonographs are adapted to play these records consecutively without requiring any control or assistance from an operator. In the many arrangements used heretofore when the last record has been moved into playing position on the turntable the automatic phonograph will continue to replay that last record until the operator either shuts off the phonograph or replaces the records in the record stack which have been moved on to the turntable. In my prior copending application referred to above, there is disclosed an arangement for automatically stopping the phonograph at the completion of playing the last record from the record stack when it has moved onto the turntable. It would be desirable to provide an improved stop means of sturdy construction, embodying a minimum number of parts which would be foolproof in operation.

Accordingly it is an object of the present invention to provide a new and improved automatic phonograph.

It is another object of the present invention to provide a mechanical stop mechanism for an automatic phonograph which is simple and compact, of sturdy construction, and which will provide foolproof operation without in any way interfering with the function or operation of the automatic phonograph or record changer during its normal record changing operation.

It is another object of the present invention to provide an automatic stop for a phonograph of the automatic record changer type in which the phonograph is automatically stopped following the playing of the last of a series of the records which are played consecutively.

It is a feature of the present invention to provide an automatic mechanical stop for a phonograph employing an automatic record changer in which the mechanism for feeding a record from the record stack to the turntable is rendered effective to initiate the stopping of the record changer during the record changing cycle following the playing of the last of a series of records.

Further objects and advantages of the present invention will become apparent as the following description proceeds and the features of novelty which characterize this invention will be pointed out with particularity in the claims annexed to and forming a part of this specification.

For a better understanding of the present invention referenec may be had to the accompanying drawings in which.

Figures 1, 2:
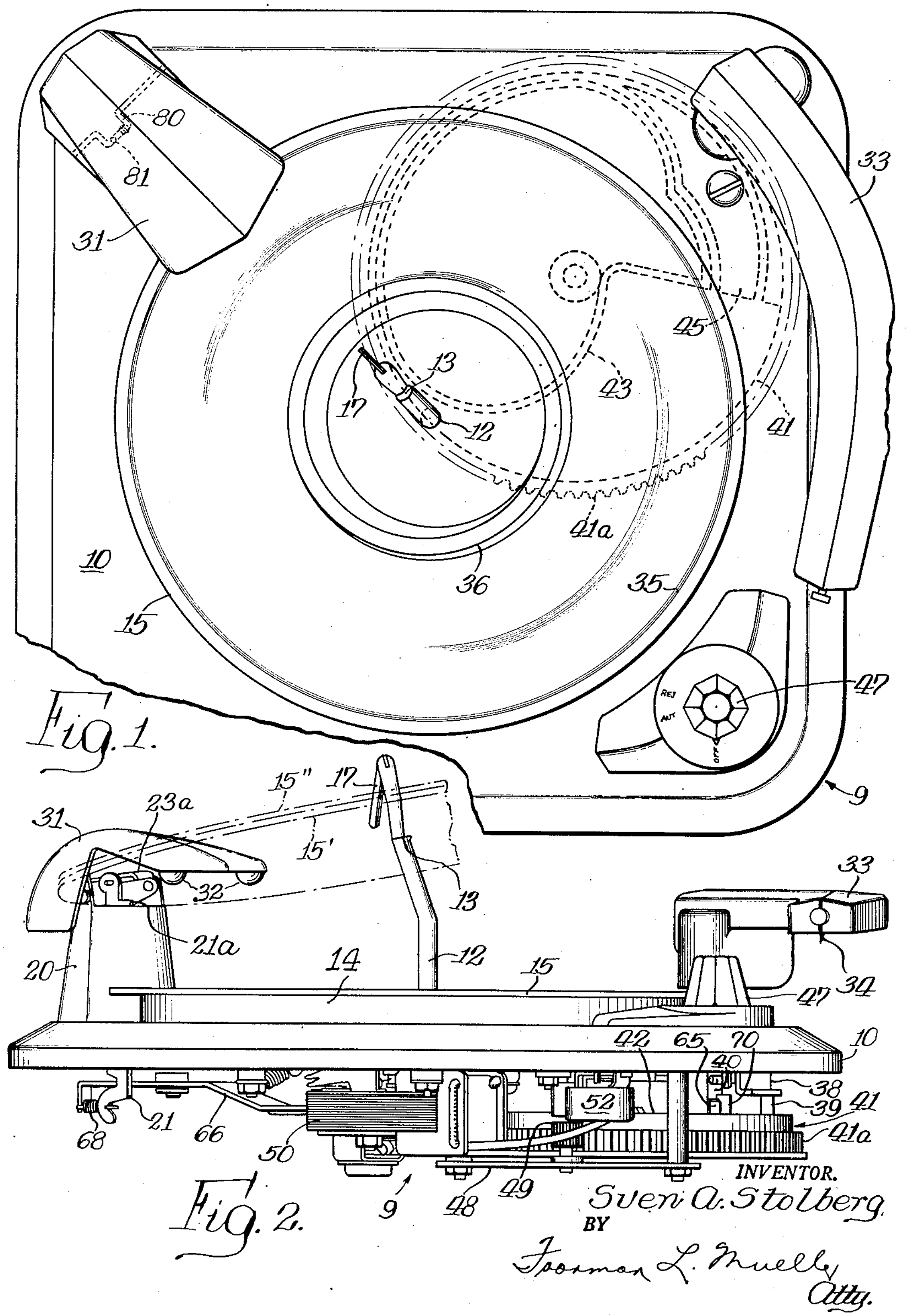
Fig. 1 is a top plan view of an automatic record changer embodying the present invention.
Fig. 2 is a side view of the record changer of Fig. 1 but showing a stack of unplayed twelve inch records disposed in a record stack above the turntable.
Figure 3:
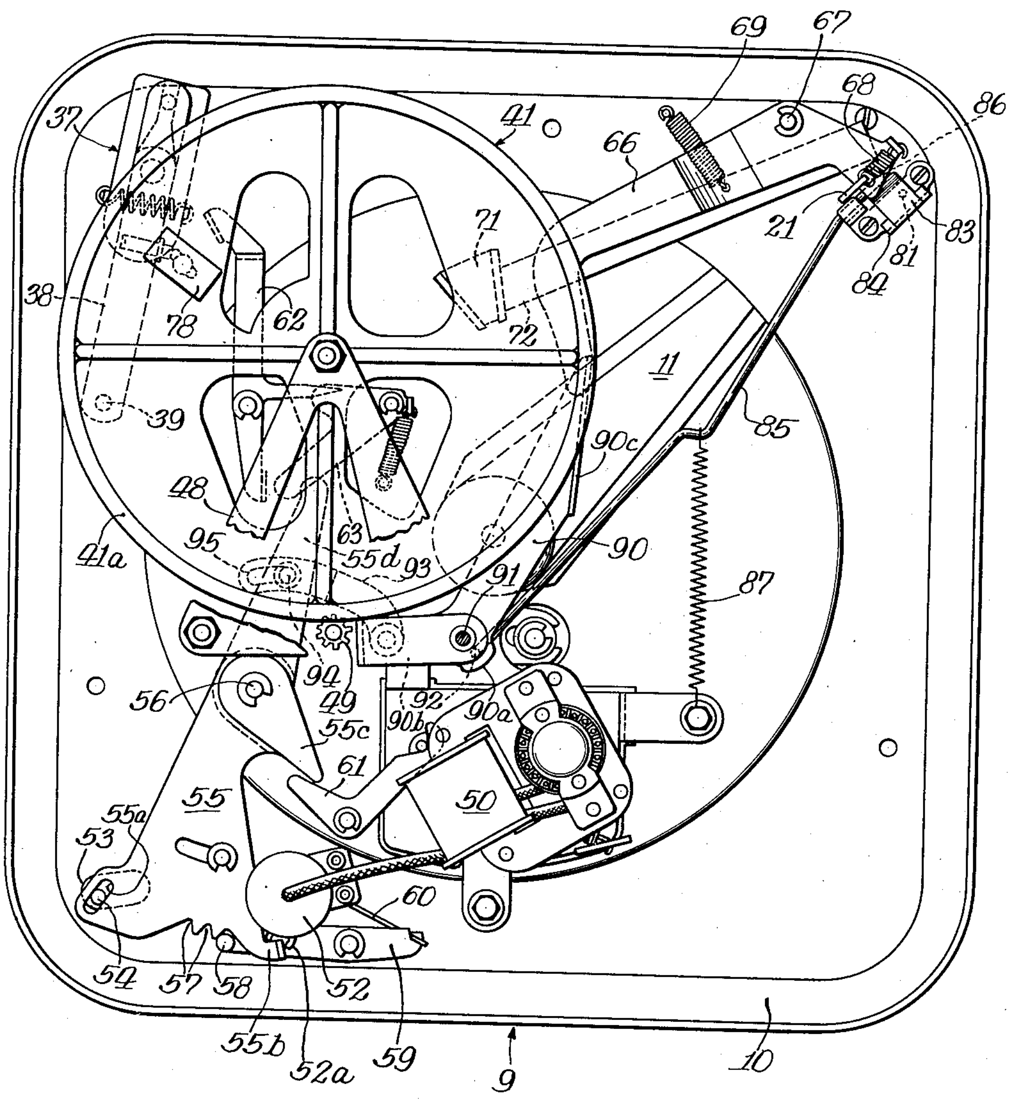
Figure 4:
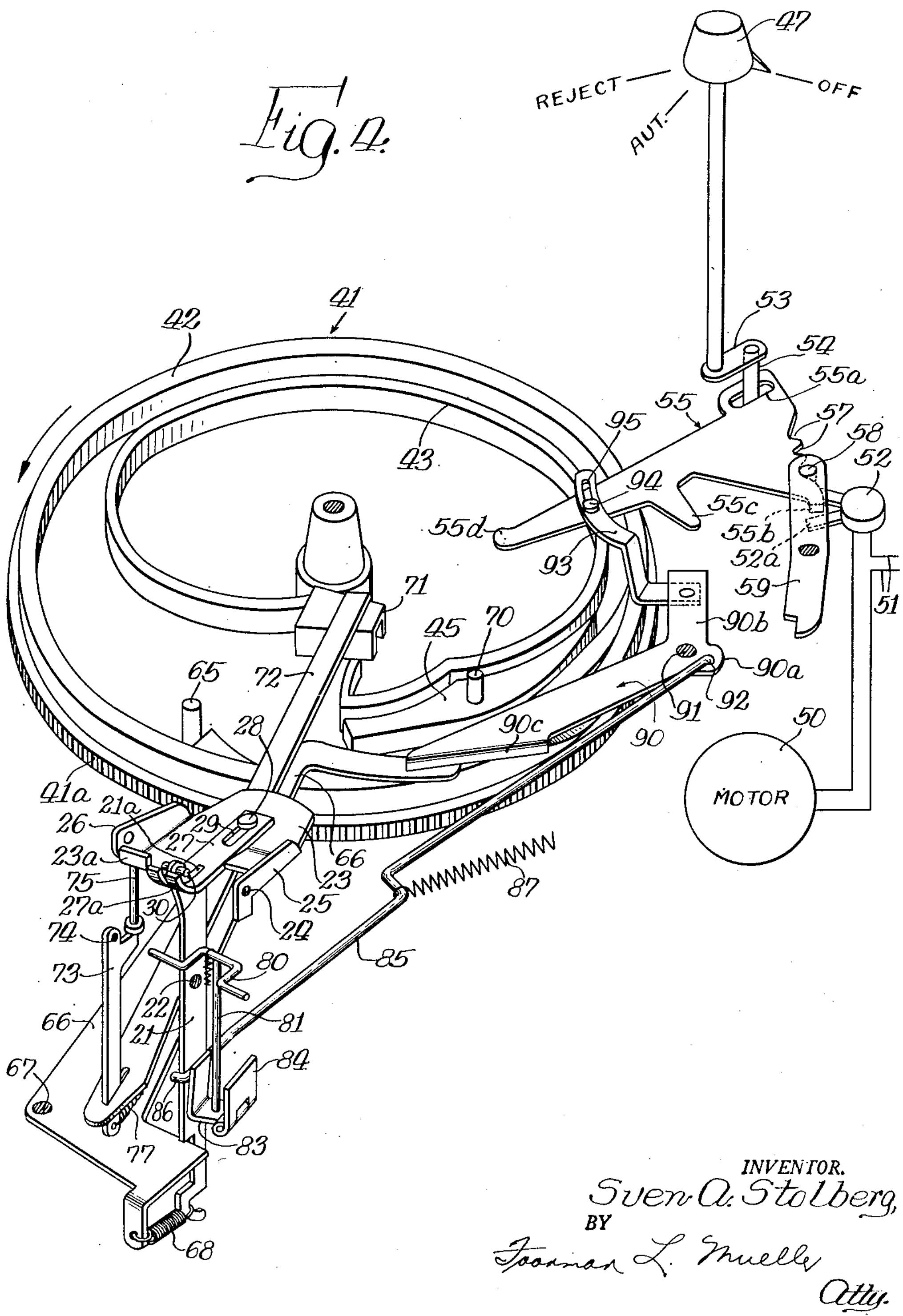

Fig. 3 is a bottom view of the automatic record changer shown in Fig. 1 of the drawings with no records in the record stack; and Fig. 4 is an enlarged semi-schematic perspective view of the stop mechanism of the record changer embodying the present invention with the parts in position for playing ten inch records, the stop mechanism in the position shown in Fig. 3 of the drawings, and the other parts of the mechanism in the positions assumed at an intermediate point during the record changing cycle.

In practicing the present invention there is provided on the stand for supporting the peripheral edges of the records of the record stack a pivotally mounted member engageable with the top surface of the topmost record in the record stack. When this member is moved to a lowered position, it normally being maintained out of this position by the presence of any records in the record stack, it causes the movement of a member into engagement with the record feeding mechanism so that subsequent actuation of the record feeding mechanism will operate a linkage mechanism for disconnecting the driving mechanism of the automatic phonograph and even cutting off the power supply to the motor for driving the phonograph and record changing mechanism. The automatic stop mechanism requires a minimum number of additional parts over those required for the automatic record changing mechanism without the automatic stop.

Referring now to the drawings, there is illustrated an automatic phonograph generally indicated at 9 having a base member 10 which serves as the support to which the various parts of the automatic phonograph are assembled. This base member 10 with the portions of the automatic phonograph assembled thereon is then readily adaptable for mounting in a suitable cabinet, not shown, which cabinet may take any desirable form. Extending upwardly from the base member 10 and rigidly fastened thereto is a spindle or center post 12, which extends well above the base 10 in a manner clearly indicated in Fig. 2 of the drawings. To insure the desired rigidity and to permit mounting the center post below the level of the base 10, the latter is provided with a channel-shaped supporting member 11 suitably fastened thereto as by welding or the like to which the spindle or center post 12 is fastened. Preferably this center post 12 is of the form disclosed in my prior copending application Serial No. 576,202, filed February 5, 1945, now Patent No. 2,517,050, dated August 1, 1950, and assigned to the same assignee as the present application.

Center post 12 is illustrated as being provided with a shoulder 13 so as to support a stack of unplayed records thereon. In addition, center post 12 is so formed that a slight lateral displacement of the lowermost record of the record stack supported on the shoulder 13 will cause release of this record so that it may slide down the center post 12 and onto a turntable 14 rotatable upon suitable bearing means coaxially arranged with post 12. Such a record indicated at 15 in Figs. 1 and 2 of the drawings is shown as having been moved into the playing position on the turntable 14. A plurality of records, such as 15′, 15″, etc., are illustrated as being disposed in the record stack supported on the shoulder 13 of the center post 12 in a manner to be described more fully hereinafter. The upper end of the spindle or center post 12 is preferably provided with a movable member 17 for preventing any but the lowermost record of the record stack from being displaced laterally so as to be moved into playing position on the turntable. The pivotally mounted member 17 is so arranged as to permit removal of the records from the turntable upon playing of all of these records without removing the center post 12 merely by raising the record stack from the turntable. This arrangement forms no part of the present invention but is disclosed and claimed in my prior copending application Serial No. 576,202 referred to above.

For the purpose of further supporting the record stack, comprising the records 15′, 15″, etc., on the center post 12, there extends upwardly from the base 10 and in a manner so as to be clear of the turntable 14 a vertical hollow post or stand 20 which also houses the periphery engaging record ejecting mechanism. Essentially this record ejecting mechanism per se forms no part of the present invention, but is disclosed and claimed in my prior copending application Serial No. 607,878 referred to above. This record ejecting or record feeding mechanism comprises a member or rock arm 21 pivotally mounted about a transverse pivot or axes 22 within the stand 20. The upper end of the lever or rock arm 21 is provided with a portion 21*a* extending above the level of the post 20 for engaging the edge of the twelve inch records, such as 15′ for example, which is the bottom record in a stack of twelve inch records supported on the center post 12, for moving such record laterally a small distance to release it from the shoulder 13.

In order that the automatic phonograph may play a series of ten inch records there is associated with the upper end of the lever 21 a suitable mechanism actuable by an operator to cause the ejection mechanism to operate on ten inch records. This mechanism comprises a turnover plate 23 pivotally mounted as indicated at 24 to suitable members 25 and 26 fastened to the stand or vertical post 20. The particular construction of the turnover plate 23 forms no part of the present invention and is fully disclosed in prior copending application Serial No. 616,879, Endo, filed December 17, 1945, now abandoned, and assigned to the same assignee as the present application.

It will be understood that the automatic phonograph disclosed in the drawings will play either a stack of ten inch records or a stack of twelve inch records and the operator must selectively manipulate the turnover plate 23 in dependence upon whether ten inch or twelve inch records comprise the record stack on the shoulder 13 of the center post 12. When this is done the ejector mechanism comprising the rock arm 21 will automatically move either a series of ten inch records one at a time or a series of twelve inch records one at a time from the shoulder 13 to the turntable 14 in proper sequence during the operation of the automatic phonograph.

In order to engage the peripheral edge of ten inch records the turnover plate 23 has slidably mounted thereon a reciprocally movable plate 27 arranged for guided reciprocal movement relative to plate 23 by means of a pin and slot connection specifically designated as 28 and 29 in Fig. 4 of the drawings. The end of the reciprocally movable plate or tongue 27 remote from the edge of the record is provided with a forked portion 27*a* for engaging a pin 30 in the upper end of the lever or rock arm 21. It will be understood that the feeding or ejecting mechanism operates in exactly the same manner when a ten inch record is moved to the turntable as when a twelve inch record is moved to the turntable. In the case of a twelve inch record the portion 21*a* of the lever 21 directly engages the peripheral edge of the record and moves the same during a record feeding operation. In the case of a ten inch record the tongue or plate 27 directly engages the peripheral edge of a ten inch record but this plate is manipulated through a movement of the rock arm or lever 21. When the turnover plate 23 is rotated to a position displaced by an angle of substantially more than ninety degrees in a counter-clockwise direction from that shown in Fig. 4 of the drawings to the position occupied by it in Fig. 2 of the drawings, the tongue 27 is disengaged from the pin 30 of the rock arm or lever 21 and consequently no movement of the tongue 27 occurs in response to movement of the rock arm 21.

Pivotally mounted to the upper portion of the post or stand 20 is a member 31 which is biased by suitable spring means, not shown, so that resilient extensions or pads 32 thereof engage the upper surface of the topmost record of the record stack supported on the shoulder 13 of the center post 12, thereby aiding in properly positioning the record stack. This manually actuated member 31 is movable so that the operator may rotate it in a counter-clockwise direction, as viewed in Fig. 2 of the drawings, to provide free access to the turnover plate 23 when setting up the phonograph for playing a stack of ten inch or twelve inch records and also to remove a stack of records from the turntable. It is apparent that this pivotally mounted element 31 is caused to move by gravity preferably supplemented by spring means, not shown, to lower and lower positions as successive records are moved from the record stack to the turntable, and finally when no records remain in the record stack the pivotally mounted member or element 31 is adapted to move to a predetermined lowermost position for performing a function which will be described in greater detail hereinafter. This lowermost position of the pivotally mounted member or element 31 will be hereinafter referred to as its functioning position.

Also extending above the base is a suitable tone arm 33 carrying the pickup unit including the needle or stylus 34 for engaging with the spiral sound groove indicated at 35 in the record 15. When the needle 34 has reached the end of the sound groove it may engage with a suitable lead in groove 36 provided in the record 15 causing the tone arm 33 to move towards the spindle 12 for a considerable distance within a very few revolutions of the turntable 14. The tone arm 33 is suitably fastened to a rotatable shaft of tubular form, not shown in the drawings. The lower end of such tubular shaft is effectively connected to a mechanism generally indicated at 37 in Fig. 3 of the drawings and comprising a secondary tone arm 38. The end of the secondary tone arm 38 includes a pin or cam follower 39. The mechanism 37 forms no part of the present invention but is disclosed and claimed in my prior copending application Serial No. 699,961, filed September 28, 1946, now abandoned, and assigned to the same assignee as the present application.

Extending through the tubular tone arm shaft, not shown in the drawings, to which the tone arm 33 is rigidly connected and to which the mechanism including the secondary tone arm 38 is connected is a tone arm raise pin 40 which operates in the conventional manner to raise the tone arm 33 at a predetermined instant during the record changing cycle and subsequently to lower the tone arm onto the particular record in playing position on the turntable 14. This raise pin 40 is actuated by means of a suitable cam 41 which is illustrated as being substantially identical in every respect with the rotatable cam disclosed and claimed in the copending Endo application referred to above. This cam 41 is mounted on a vertical axis as indicated in the drawings and the edge or rim portion 42 thereof forms a cam for actuating the raise pin 40 at the proper time during a record changing cycle in a manner which will be apparent to those skilled in the art. The rotatable cam 41 also includes a cam track for the cam follower 39 a large portion of which is defined between a raised portion 43 on the upper surface of the cam 41 and the rim portion 42. A portion of the cam track for the cam follower 39 is also defined between a slidable member 45 and either the rim 42 or the raised portion 43. The cam follower or pin 39 of the secondary tone arm 38 follows this cam track and consequently controls the position of the tone arm 33 so as to move it clear of the turntable or back into playing engagement with the record in playing position on the turntable 14. The slidable member or segment 45 controls the initial positioning of the tone arm relative to the record in playing position on the turntable in dependence upon whether a ten inch or a twelve inch record is involved.

In addition to the elements described thus far extending upwardly from the base 10 and consequently extending into the view of the operator there is provided a manual control button 47 by means of which the phonograph may be controlled. This button may be used to turn off the phonograph, to selectively preset the mechanism for manual or automatic operation of the phonograph or to cause rejection of any record that is moved into playing position on the turntable. The function of the manual control button 47 will be briefly described in connection with the mechanism which it actuates for purposes of a complete disclosure although it forms no part of the present invention.

Referring now to the underside of the base 10 shown in Fig. 3 of the drawings, it may be observed that most of the mechanism is supported there out of the view of the operator. The cam 41 referred to above which esentially comprises a multiple of one cycle cams is suitably supported below the base 10 by means of a triangular shaped bracket 48 which is supported in a position somewhat parallel with the base 10 by suitable supporting means depending from the base 10. The cam 41 is rotatable about one of the supporting means and is adapted to be actuated during the record changing cycle by the rotation of a pinion 49 engaging with the teeth 41a formed on the periphery of the cam 41. The pinion 49 is adapted to be driven at a predetermined time during the operation of the automatic phonograph by an electric motor generally indicated at 50 and supported from the base 10. The particular construction of the motor 50 forms no part of the present invention, but is preferably of the type disclosed and claimed in a copending application of Earle W. Ballentine, Serial No. 711,694, filed November 22, 1946, now Patent No. 2,492,207, isued December 27, 1949, and assigned to the same assignee as the present application. This motor 50 also drives the turntable 14 as by suitable friction wheels, not shown, one of which is adapted to engage the rim of the turntable 14. The mechanism for controlling the drive of the turntable and the cam 41 forms no part of the present invention but is disclosed and claimed in my copending application, Serial No. 535,218, filed jointly with Earle W. Ballentine on May 12, 1944, now Patent No. 2,480,623, dated August 30, 1949, and assigned to the same assignee as the present invention. To control the power supplied from a suitable source of electrcal energy indicated at 51 in Fig. 4 of the drawings to the motor 50 there is provided a suitable switch 52 supported from the underside of the base 10.

In order to transmit the motion produced by the adjustment of the button or manual control member 47 described above, it is connected to a crank 53 having a pin 54 which engages a slot 55a in a manually actuable lever 55 which lever is pivotally mounted to the base 10 as indicated at 56. This lever 55 is provided with a plurality of notches 57 engageable with a pin 58 which acts as a positioning means. Pin 58 is mounted on a lever 59 suitably biased as by means of a spring 60 into engagement with the notched portions 57 of the lever 55. Lever 55 is also provided with a projection 55b which actuates the switch 52 which switch is provided with a suitable movable arm 52a engageable with the portion 55b of the lever 55 thereby controlling the power supplied to the motor 50 from the source 51 when the button 47 is moved to or from the off position. Lever 55 also includes an extension 55c controlling a bell-crank 61 which when button 47 is moved to the off position moves the friction drive for the turntable 14 and the cam 41 to an inoperative position. When the button 47 is moved to the automatic position, the drive between the motor 50 and the cam 41 is rendered effective dependent, however, upon suitable releasable or latching means forming no part of the present invention which means control the initiation of the record changing cycle. This releasable means includes a trip lever 62 pivotally mounted to the base 10 and when this trip lever 62 is actuated it in turn moves a lever 63 to release the latching mechanism whereby the drive between the motor 50 and the cam 41 is rendered effective. When the button 47 is moved to the reject position, the end 55d of the lever 55 engages the trip lever 62 so as to actuate or initiate the record changing cycle immediately regardless of the position of the tone arm 33 relative to the record being played. When it is desired to play only a single record which is placed on the turntable, generally referred to as manual operation of the automatic phonograph, the button 47 is turned away from the stop position to the automatic position. As will become apparent from the following description, the phonograph will play this one record and then stop with the tone arm 33 free of the record so a new record can be positioned manually on the turntable.

In order that the ejector mechanism including the lever 21 may be actuated at the proper time to release a record onto the turntable in synchronized relationship with the movement of the tone arm 33, the cam 41 is provided with an upwardly extending pin 65 which engages the end of a lever 66 pivotally mounted to the underside of the base 10 and having one end connected by suitable means with the lower end of the lever 21. Preferably, this connection between the lower end of the rock arm or lever 21 and the lever 66 pivotally mounted to the base 10 as indicated at 67 includes a suitable spring 68 through which the force for feeding a record from the record stack to the turntable is transmitted.

The arrow in Fig. 4 of the drawings indicates the direction of rotation of the cam 41 during a record changing cycle and it may be observed that in the illustrated position the pin 65 is just about ready to engage the end of the lever 66 to cause actuation of the rock arm 21. With this arrangement, it is obvious that at a predetermined point during the record changing cycle and consequently during the cycle of the cam 41, the pin 65 causes pivotal movement of the lever 66 with the consequent pivotal movement of the lever 21 to perform a record releasing function whereby the bottommost record such as 15' of the record stack on the center post 12 is moved into playing position on the turntable 14. A suitable spring 69 normally biases the lever 66 into the position indicated in Figs. 3 and 4 of the drawings so as to move the rock arm 21 to the non-record feeding position shown in Fig. 2 of the drawings.

As is fully disclosed in the above-mentioned Endo application, the slidable segment 45 referred to above is provided with a pin 70 which engages at a predetermined instant during the cycle of operation of the cam 41 with a trough-shaped cam member 71 attached to a slide bar 72. The position of the slide bar 72 is controlled by the position of the turnover plate 23 referred to above as by means of a suitable lever 73 pivotally mounted as indicated at 74 within the stand or vertical support 20 and a suitable reciprocally movable pin 75 adapted to be engaged by an extension 23a of the turnover plate 23. When the turnover plate 23 is in the position shown in Fig. 4 of the drawings, the pin 75 is biased downwardly by virtue of the extension 23a causing the pivotally mounted lever 73 to pivot in a clockwise direction, with the consequent result of pulling the slide bar 72 in a direction away from the center of the cam 41. This, of course, will result in movement of the sliding segment 45 against the outer rim 42 as shown in Fig. 4 of the drawings so as to position the tone arm for playing ten inch records. When the turnover plate 23 is moved to the position shown in Fig. 2 of the drawings, a suitable spring 77 biases the slide bar 72 inwardly toward the center of the cam 41 so as to move the segment 45 when pin 70 engages the trough 71 against the raised portion 43 of the cam with the consequent positioning of the tone arm 33 for playing twelve inch records. It is apparent that with this arrangement, the shape of a small portion of the cam track for the cam follower 39 is controlled properly to position the tone arm 33 in dependence upon whether a ten inch or a twelve inch record is moved into playing position on the turntable. As is shown in Fig. 3 of the drawings, a flat spring member 78 engaging the bottom surface of the cam 41 insures that the movable segment 45 remains as set unless changed by the operation of the trough-shaped cam 71. The control of the cam track for the cam follower 39 by means of the trough-shaped cam 71 which is operated in response to the movement of the turnover plate 23 is fully disclosed and claimed in the copending Endo application referred to above.

In accordance with the present invention, it is desired to automatically stop the phonograph when the last record of a series of records disposed in the record stack above the turntable 14 has been moved into playing position on the turntable 14 and reproduced. In accordance with the present invention, such automatic stopping means is provided by employing a minimum number of parts and utilizing certain elements already provided to perform the additional function of stopping the phonograph. As was pointed out above, the member 31 pivotally mounted to the stand 20 engaging the top surface of the topmost record of the record stack moves to lower and lower positions as successive records are moved from the record stack to the turntable. It is apparent that the member 31 is capable of giving an indication of when no more records remain in the record stack. It should be understood, however, that although the present invention is illustrated as utilizing the movement of the pivotally mounted member 31 for intiating the stopping mechanism when no records remain in the record stack, any other suitable means responsive to the movement of the last record from the record stack onto the turntable may equally well be employed. Since the member 31 or a similar member is often incorporated in a record changer for steadying and aiding in the support of the records in the record stack, this member has been chosen to initiate the stopping mechanism since no additional parts are required. As is illustrated in my prior copending application, Serial No. 607,878 referred to above, the member 31 is normally mounted on a suitable crank mechanism 80 pivotally supported by stand 20. If desired, the biasing means for the pivotally mounted member 31 may be connected to the crank 80 in a manner so as to provide an over-center arrangement whereby, when the pivotally mounted member 31 is in the position shown in Fig. 2 of the drawings, the spring not shown biases it downwardly and, when it is in a turned-over position to permit the removal of records or the replacement of a new series of records in the record stack, it biases the pivotally mounted member 31 in the opposite direction.

In order to utilize the movement of the pivotally mounted member 31 when moved to its functioning position, which is its lowermost position, following movement of the last record from the record stack onto the turntable, there is provided a reciprocally mounted pin 81 engageable by the crank 80. The lower end of the pin 81 engages a suitable L-shaped lever 83 hingedly mounted to a member 84 supported from the base 10. The end of the L-shaped member 83, not hinged to member 84, is adapted to control the movement of one end of a rod or link 85. This rod or link 85 is provided with a hook-shaped portion 86 which may be moved so as to engage one edge of the rock arm or lever 21. A suitable spring 87 normally biases the rod 85, the L-shaped lever 83 and the pin 81 to a position out of engagement with the rock arm 21.

In accordance with the present invention, there is provided a bell-crank 90 suitably pivoted as indicated at 91 to the base 10. The bell-crank 90 is provided with a short arm 90*a* to which the other end of the rod 85 is connected as indicated at 92. The other arm of the bell-crank 90 extends over the cam 41 and is adapted to be moved into interfering position with the pin 65 as will be brought out hereinafter. Normally, the spring 87 moves the long arm of the bell-crank 90 to a position indicated in Fig. 4 of the drawings clear of the pin 65. The pivotally mounted bell-crank 90 also includes an arm 90*b* which is connected by means of a suitable link 93 with the lever 55. This connection between the link 93 and the lever 55 is illustrated as of the lost motion type comprising a pin and slot connection specifically designated at 94 and 95, respectively.

When the last record from the record stack has moved onto the turntable 14, the pivotally mounted member 31 engaging the top surface of such last record is permitted to move to its lowermost or functioning position with the result that the pin 81 and the L-shaped lever 83 move against the bias of the spring 87 to move the hook-shaped end 86 of the rod 85 into engagement with one surface of the rock arm 21. When the last record has been reproduced by movement of the tone arm 33 in a normal manner across the record provided with the sound grooves 35, the record changing cycle is initiated and the cam 41 rotates to feed another record onto the turntable even though no record remains in the record stack. When the pin 65 engages the pivotally mounted lever 66 to perform a record feeding operation with respect to the rock arm 21, reciprocal movement of rod 85 is also caused by virtue of the engagement of the hook-shaped end 86 thereof with the rock arm 21 with the consequent pivotal movement of the bell-crank 90 in a clockwise direction as viewed in Fig. 4 of the drawings. Such movement of the bell-crank 90 causes the arm 90*c* thereof to move into a position so as to be engaged by the pin 65 when it reaches a later position during the cycle of the cam 41. Continued rotation of the cam 41 causes the pin 65 to move the bell-crank 90 sufficiently so that through link 93 lever 55 is pivoted not only to disengage the driving connection between the motor 50 and the cam 41 but also to disengage the driving connection between the motor 50 and the turntable 14 and finally to open the switch 52 to deenergize the motor 50. It will be noted that the record feeding mechanism comprising the rock arm 21 is used to actuate the stopping mechanism and only a very slight additional force is required since the movement of the record feeding mechanism is not employed to actuate the lever 55 but is merely employed slightly to move the bell-crank 90 into interfering position with pin 65 whereupon the latter mechanism capable of applying ample force performs the stoping operation. It will be noted that the stop mechanism requires only the pin 81, the L-shaped member 83, the rod 85, the bell-crank 90 and the link 93 in addition to the parts already present in the record changer, all of which parts may comprise simple stampings adding very little extra cost to the record changer to perform the automatic stopping operation.

In view of the detailed description included above, the operation of the automatic stop means for the record changing phonograph will be apparent to those skilled in the art and no additional description therefor is included herein. It will be understood that a very simple, sturdy mechanism adding substantially no additional cost to the record changer is provided which is foolproof in operation. This stop mechanism utilizes moving means already provided on the record changer.

Although a preferred embodiment of the present invention has been disclosed in complete detail so as to insure a complete understanding of the invention, it is contemplated that details of the disclosed structure are capable of modification and that other applications and features of the invention may occur to those skilled in the art. Hence, it is intended in the appended claims to cover all such modifications as fall within the true spirit and scope of the present invention.

I claim:

1. In an automatic phonograph including a record changing mechanism, a rotatable turntable, means for supporting a stack of unplayed records above said turntable, a rotatable cam including a pin mounted thereon, driving means for said cam and said turntable, means for rendering said driving means ineffective to operate said cam at the end of said record changing cycle, record feeding means including a rock arm, a lever connected to said rock arm engageable by said pin during a record changing cycle in response to a predetermined rotation of said cam to cause the lowermost record of said stack to move into playing position on said turntable, a movable member disposed in an inoperative position as long as one or more records are disposed in said stack and movable to a functioning position following movement of the last remaining record of said stack onto said turntable, a rod disposed adjacent said rock arm having a hook-shaped portion adapted to engage said rock arm in response to the movement of said member to said functioning position, pivotal means connected to said rod and movable to an interfering position relative to said pin in response to movement of said rock arm following movement of said member to said functioning position, means for rendering said driving means ineffective to drive said cam or said turntable, and means responsive to continued movement of said cam following movement of said pivotal means to said interfering position for actuating said last-mentioned means.

2. In an automatic phonograph including a record changing mechanism, a rotatable turntable, means for supporting a stack of unplayed records above said turntable, a rotatable cam operative during a record changing cycle to control a record changing operation, a motor for driving said cam, means for rendering said motor ineffective to drive said cam at the end of said record changing cycle, record feeding means operative during a record changing cycle in response to a predetermined rotation of said cam to cause the lowermost record of said stack to move into playing position on said turntable, a movable member disposed in an inoperative position as long as one or more records are disposed in said stack and movable to a functioning position following movement of the last remaining record of said stack onto said turntable, a rod having a hook-shaped end actuated in response to the movement of said member to said functioning position so that said hook-shaped end extends into the path of movement of a movable portion of said record feeding means, a bell-crank operatively connected to said rod and movable to a predetermined interfering position in response to movement of said rod upon operation of said record feeding means, means on said cam for engaging and moving said bell-crank following movement thereof to said predetermined interfering position, and means responsive to movement of said bell-crank for deenergizing said motor.

3. In a record changer, a changing mechanism, a rotatable turntable, means for supporting a stack of unplayed records above said turntable, a rotatable cam including a pin mounted thereon, a motor for driving said cam and said turntable, means for rendering said motor ineffective to operate said cam at the end of said record changing cycle, record feeding means including a pivotally mounted rock arm, a lever connected to said rock arm engageable by said pin during a record changing cycle in response to a predetermined rotation of said cam to cause said rock arm to move the lowermost record of said record stack into playing position on said turntable, a sensing member disposed in an inoperative position as long as at least one record is disposed in said stack and movable to a functioning position following movement of the last remaining record of said stack onto said turntable, a rod disposed adjacent said rock arm having a hook-shaped portion adapted to move into the path of movement of said rock arm in response to the movement of said sensing member to said functioning position, a bell-crank connected to said rod and movable to an interfering position relative to said pin in response to movement of said rock arm while said hook-shaped portion is disposed in the path of movement of said rock arm, switch means for controlling said motor, and means interconnecting said switch means and bell-crank whereby continued movement of said cam following movement of said bell-crank to said interfering position causes said pin to engage said bell-crank and move the same to open said switch.

4. Means as defined in claim 3 whereby said means interconnecting said switch means and bell-crank includes a lost motion connection.

5. Means as defined in claim 1, together with means for normally biasing said rod so that said hook-shaped portion is out of engagement with said rock arm.

SVEN A. STOLBERG.

REFERENCES CITED

The following references are of record in the file of this patent:

UNITED STATES PATENTS

| Number | Name | Date |
|---|---|---|
| 2,295,092 | Offen | Sept. 8, 1942 |
| 2,333,414 | De Tar | Nov. 2, 1943 |
| 2,484,570 | Johnson | Oct. 11, 1949 |